April 10, 1928.

A. DOW

1,665,408

VARIABLE SPEED POWER TRANSMISSION

Filed Oct. 9, 1925     7 Sheets-Sheet 4

Inventor
Alexander Dow
By his Attorney

Patented Apr. 10, 1928.

1,665,408

UNITED STATES PATENT OFFICE.

ALEXANDER DOW, OF NEW YORK, N. Y., ASSIGNOR TO DOW TRANSMISSION CORPORATION, OF NEW YORK, N. Y., A CORPORATION OF NEW YORK.

VARIABLE-SPEED POWER TRANSMISSION.

Application filed October 9, 1925. Serial No. 61,509.

My invention relates to geared power tranmission mechanism whereby the speeds of the driving shaft and driven shaft may be changed to produce such relative torques as conditions may require and is a continuation in part of my application for Letters Patent, Serial No. 39,525, filed June 25, 1925, for improvement in variable speed power transmission, which in turn is a continuation in part of my application for Letters Patent Serial No. 725,402, filed July 11, 1924, also for improvement in variable speed power transmission.

An object of this invention when applied to motor car construction is to enable the driver to alter the gear ratios in the transmission gear merely by the use of the throttle or foot accelerator without having either to throw out the clutch or manipulate manual gear changing apparatus A further object of my invention is provide epicyclic means whereby changes of gear ratios are easily and quickly made by utilizing the momentum of the car as the physical means for holding or releasing such members of the epicyclic train as will produce, in succession, such gear changes as may be desired by manipulating the throttle thus causing the transmission mechanism to be driven either by the engine or by the momentum of the car as the driver may desire.

In the construction shown herein three forward speeds and reverse are provided, although the invention is not limited to this number. The three speeds referred to may be termed "low", "intermediate" and "high" gear. Manual means are herein provided by the setting of which the gear will progress automatically from low to intermediate and to high gear, or it will progress from low to high gear with the intermediate gear eliminated, or it will progress from intermediate to high gear and back to intermediate with the low speed eliminated, as the driver may desire. This construction also shows means whereby the coil brakes for carrying the reaction of the driving gears are protected against excessive stress, improved means for tightening the said coil brakes and means whereby the change from high gear to intermediate at high speeds in descending hills is easily brought about without the difficulty experienced in conventional sliding gear transmissions. The construction described herein also provides modified means for performing some of the operations and greater accessibility to the mechanism for assembly and repair and the elimination of some parts shown in the previous applications referred to.

The accompanying drawings illustrate one form in which my invention can be embodied. It is to be understood, however, that this invention is not limited to the exact details of construction described herein as various modifications of the same will occur to persons skilled in the art.

In the drawings.

Fig. 4ª is a plan view looking downward upon one side of the transmission at the line 4ª—4ª in Fig. 4 and shows a detail of the construction at that point.

Fig. 5ª is a view partly in section of a detail of construction viewed from the line 5ª—5ª of Fig. 1 looking toward the front of the transmission;

The frame or casing 1 of the transmission is shown in whole or in part in each of the drawings Figure 1 to Figure 7, inclusive, and is of a hollow and generally cylindrical form throughout the greater part of its length, split through its center in a horizontal plane for convenience in manufacture and assembly, and terminating at one end in a conventional clutch housing 2 adapted to be bolted to the engine bell housing.

Casing 1 is provided upon the exterior and upon the interior with surfaces, bosses, lugs and apertures to properly receive and support the mechanism mounted within it and its cooperating parts. Two cover plates are also provided to afford access to the interior of the casing, all of which are clearly shown in the drawings referred to. When the two parts of casing 1 are bolted together with their several parts assembled they form an oil-tight chamber for the mechanism, which receives its lubrication from the oil placed in the casing.

Figure 3:
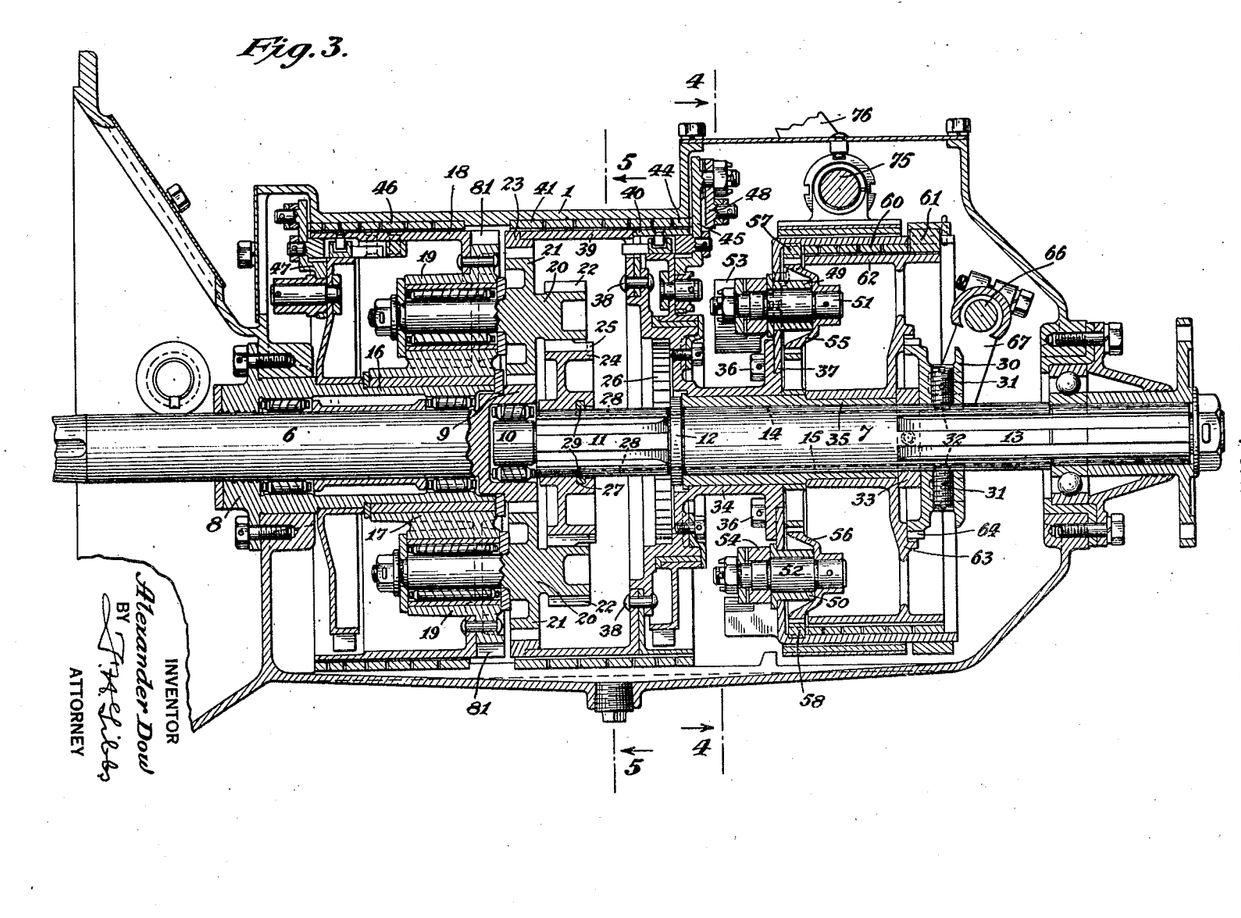
Fig. 3 is a vertical central longitudinal section of Fig. 1 upon an enlarged scale.

Referring to Figure 3, passing centrally through casing 1 are two shafts 6 and 7. Shaft 6 carries the engine clutch and is mounted to rotate in bearings held in bearing retainer 8 bolted to the front wall of the casing. Integral with shaft 6 and upon its inner end is the sun gear 9 with an orifice to receive a roller bearing to support the pilot end 10 of shaft 7. Shaft 7 is provided with a ball bearing and bearing retainer at its outer end and a face plate for a universal joint for driving the propeller shaft of the car. These parts are arranged to resist all thrust upon the transmission mechanism incident to driving.

Figures 5, 5A:
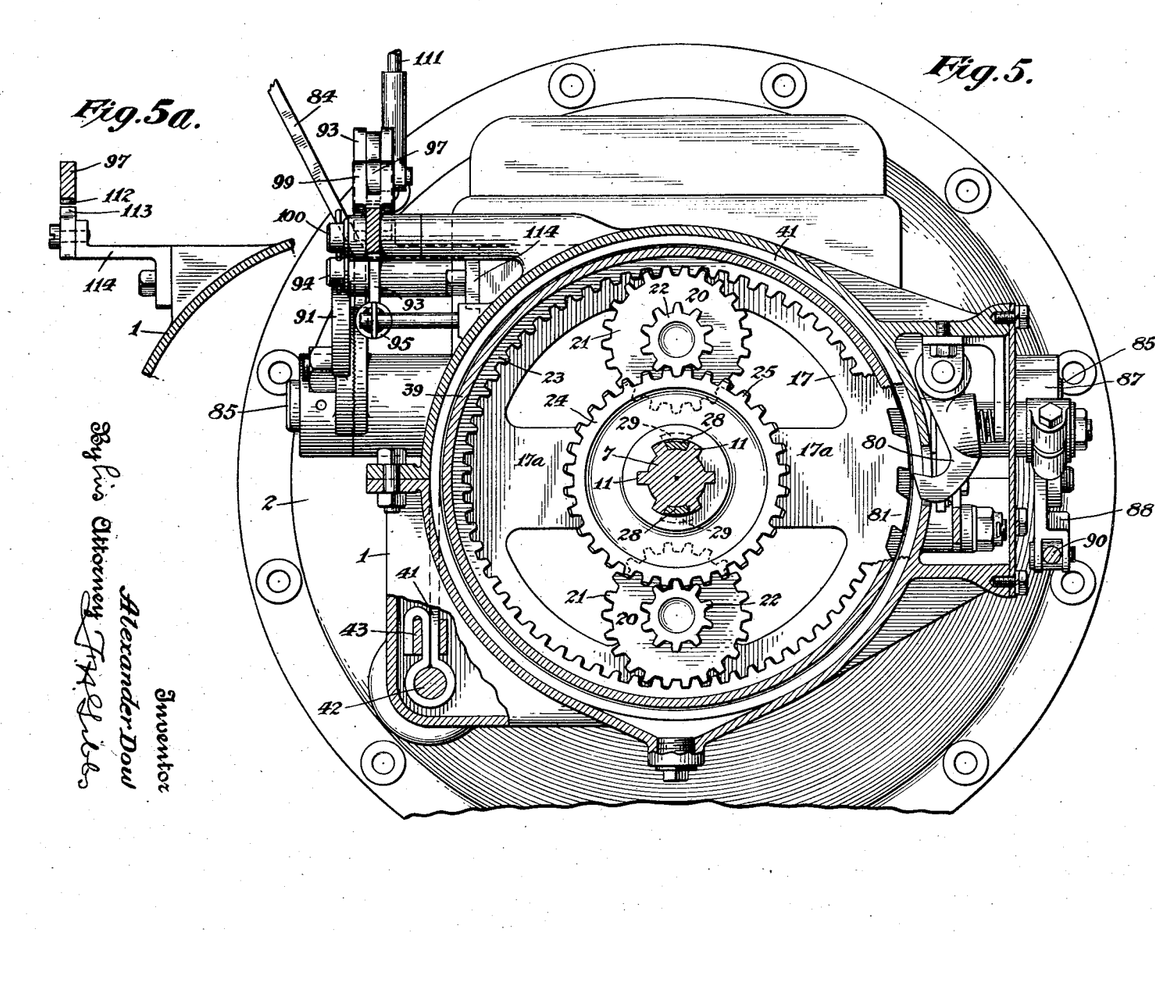
Fig. 5 is a vertical cross section on line 5—5 of Fig. 3.

Shaft 7 is provided at one end with a splined portion 11, with a collar 12 and splined portion 13, the purposes of which will be explained later. Two diametrically opposed grooves 14 and 15 of the two splines 11 and 13 traverse the portion of the shaft between the two splined ends. Provided with a suitable bushing 16 and adapted to rotate freely upon bearing retainer 8 is gearhead 17. This is best shown in Fig. 5 and consists of a hub with approprite arms 17ᵃ and a rim 18 clearly shown in Fig. 3. Two of the opposed arms are provided with bosses 19 bored to receive bearings for the stud axles of the two compound planet gears 20 mounted therein. Each of the compound planet gears is cut with a larger gear 21 and a smaller gear 22. Gears 21 are mounted in a manner to constantly engage in toothed relation sun gear 9 upon the clutch shaft 6 and also in toothed engagement with annular internal gear 23 attached to the second speed rotor. Further, the small gear 22 at the same time properly engages main driven gear 24 constructed to slide upon the splined portion 11 of shaft 7. Gear 24 is cut with a reduced portion 25 adapted to act as a tooth clutch to engage the toothed female clutch 26 cut in the second speed rotor which will later be described. Gear 24 also has an inside annular groove 27 adapted to receive gear shifting fingers 28 which are provided with an up-turned edge or flange 29 fitting groove 27. Gear shifting fingers 28 can slide horizontally in the grooves 14 and 15 and are actuated by gear shifting collar 30 slidable on splines 13 and which is provided with two screws 31 having stud ends extending into orifices in fingers 28 at 32. It is seen from this construction that gear 24 partakes of any movement of gear shifting collar 30.

Rotatably mounted upon shaft 7 and prevented from lateral displacement by collars 12 and 33 is second speed rotor 34 furnished with bushing 35 and carrying upon it certain other parts now to be described. Securely held by bolts 36 to rotor 34 is the annular flange member 37, the outer surface of which serves as an emergency brake drum and the inner surface as a retaining shell for the high speed clutch coil and also as a guide for the controlling mechanism of the coil clutch. Riveted to rotor 34 at 38 are two flanged drums 39 and 40 which together form a wide drum-like rim for rotor 34. Annular gear 23 is welded or otherwise attached to flange 39.

Seen in section in Figure 3 and in side elevation in Figure 5 is the tapering metal spring helical coil brake 41 constructed (when not in engagement with drum 39 of rotor 34) to be confined by the inside surface of casing 1 as is clearly shown in Figure 3. One end of coil brake 41, shown in Figure 5, leaves drum 39 in a downward tangential direction and is firmly anchored to casing 1 upon horizontal stud 42. Coil brake 41 encircles drum 39 and is securely held by thimble 43. The stud 42 is also shown in relation to casing 1 in Fig. 1. The other end 44 of coil brake 41 is bent at right angles to itself to engage the automatic coil controlling mechanism 45, as shown in Fig. 3 and the details of which are shown and described in my previous application, Serial No. 39,525, filed June 25, 1925. By both frictional and clamping means, the automatic coil brake controlling mechanism just referred to causes coil brake 41 to automatically tighten upon drum 39 and check the movement of rotor 34 when the same revolves in an anti-clockwise direction, and permits it to turn freely and without resistance in a clockwise direction.

Still referring to Figure 3, surrounding drum 18 of gearhead 19 is coil brake 46 also anchored to casing 1 upon stud 42 and provided with substantially the same automatic coil brake controlling mechanism 47 adapted to check the anti-clockwise revolution of gearhead 19. Controlling mechanism 45 and 47 differ only in that controller 45 requires the adjustable lever 48 which is not necessary on the coil controller 47 as has been set forth in my application filed June 25, 1925.

Figures 4, 4A:
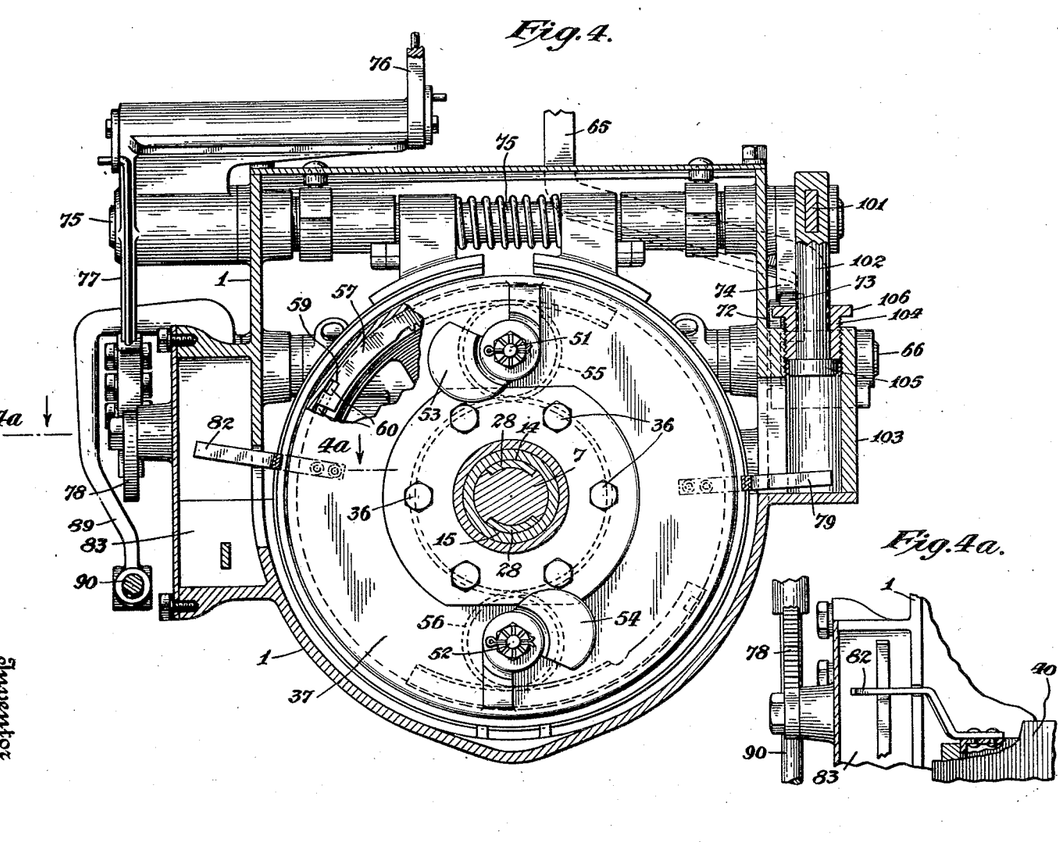
Fig. 4 is a vertical cross section taken upon the line 4—4 of Fig. 3.

Referring to Fig. 3 and Fig. 4, two bushings 49 and 50 are located in the flanged member 37 which is bolted to rotor 34 adapted to receive studs 51 and 52 which carry fly balls 53 and 54. Pinned to those two shafts are the two clutch coil operating gears 55 and 56 in toothed engagement with the two circular racks 57 and 58, suitably guided in member 37. One of these 57, is provided with a slot 59 adapted to receive the right angle end of clutch coil 60, which is a tapered helical spring coil confined within flanged member 37 and anchored thereto in ring 61.

Rotatably mounted upon bushing 35 and restrained against lateral movement is high speed clutch drum 62 which can turn freely within the clutch coil 60 when not gripped together by the action of the fly balls 53 and 54 under centrifugal force developed by the rotation of rotor 34. Clutch drum 62 is provided upon its outer hub face with the internal female clutch face 63 adapted to engage clutch teeth 64 formed upon gear shifting collar 30. Clutches 63 and 64, as well as the operating mechanism, are controlled by gear shifting lever 65 which lever is mounted upon shaft 66 and is shown in several figures and controls the relative positions of clutches 63 and 64, as is best shown, upon an enlarged scale in Figure 7.

Figure 2:
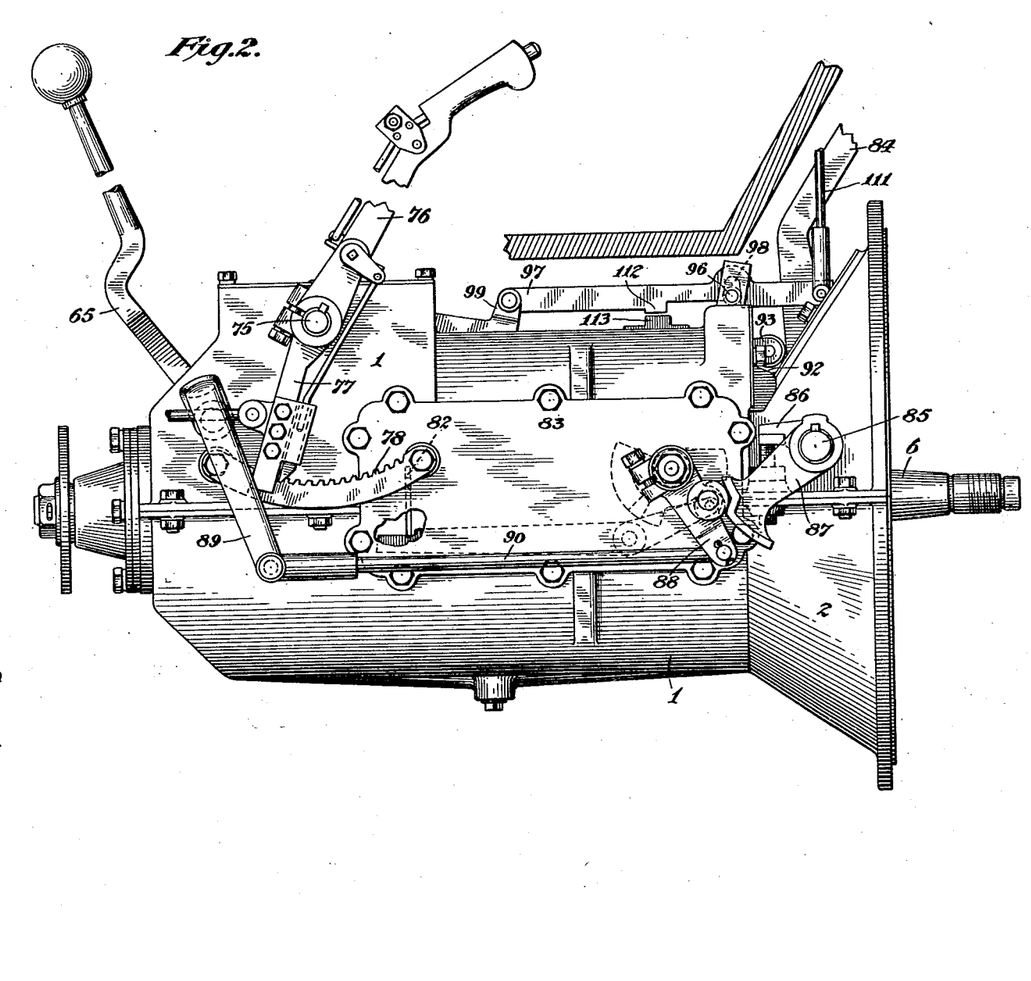
Fig. 2 is a side elevation of my transmission looking in the direction opposite to that of Fig. 1 and shows the mechanism actuated by the clutch pedal and more fully the emergency brake mechanism.
Figure 7:
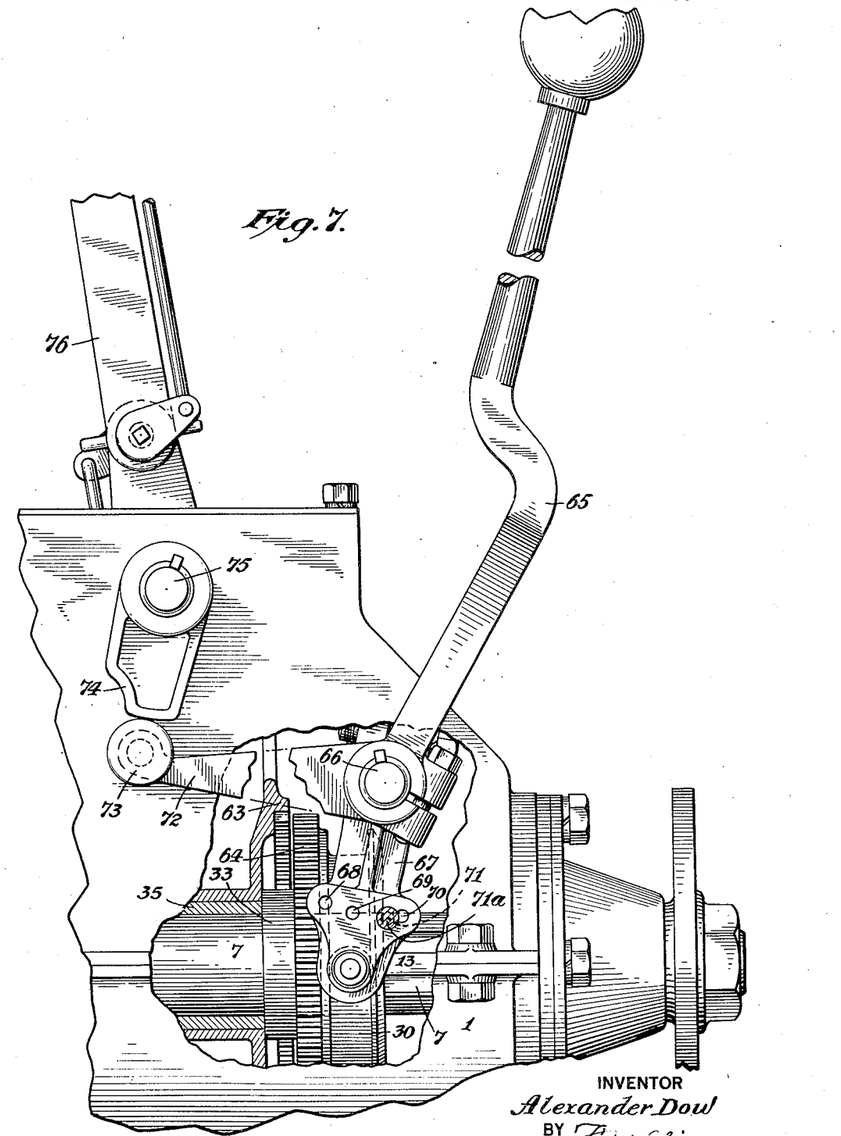
Fig. 7 is an enlarged view of the gear setting mechanism and its relation to the high speed clutch and emergency brake mechanism.

Referring to Figure 7, within the casing 1 and mounted to rock with shaft 66 is the yoke lever 67 having two studs entering the groove in collar 30 for the purpose of shifting said collar. One arm of this yoke lever has four conical orifices 68, 69, 70 and 71 by which the gear shifting lever 65 is held in the forward, reverse and neutral positions by spring plug 71ª. Lever 65 has also projecting from its hub the arm 72 carrying a cam roller 73 at its end. Cam roller 73 serves to engage cam 74 keyed to emergency brake shaft 75 at the other end of which is keyed emergency brake lever 76. Lever 76 has a depending arm 77 provided with a conventional detent and ratchet 78 as shown in Fig. 2. It will be seen by referring to Fig. 7 that when the emergency brake lever 76 is rocked from its zero position shown in Fig. 2 to the position shown in Figure 7, its cam 74 will have depressed arm 72 of lever 65 to an extent to release clutches 63 and 64, the purpose of which will be explained later.

As has been fully described and set forth in my two previous applications referred to, when the car is driven in low gear, gearhead 17 is at rest checked against anticlockwise movement by coil brake 46, and rotor 34 turns anticlockwise, the coil brake 41 thereof being held out of engagement with drum 39 by the depression of arm 79 shown in Figure 4 controlled by the depression of the engine clutch lever. When the car is backing gearhead 17 is prevented from revolving clockwise by pawl 80 engaging teeth 81 cut on the face of gearhead 17 as shown in Fig. 5. When the gear is in reverse, rotor 34 travels in an anti-clockwise direction, coil 41 being held out of engagement with the rotor drum. This is brought about by the elevation of arm 82 by the mechanism contained in the reverse box 83 shown in Figs. 2 and 4 and which has been previously described. Referring to Figures 1, 2 and 6, 84 is the engine clutch lever keyed to clutch shaft 85 passing through clutch housing 2. In Figure 2 it is seen that shaft 85 carries a stop lever 86 for the purpose of adjusting the position of the clutch shaft 85 and cam lever 87 in relation to roller lever 88 to which gear shifting lever 65 is connected through the medium of lever 89 and rod 90, all shown in Fig. 2. As the clutch shaft 85 is shown in this figure in its uppermost or zero position, it is obvious that immediately upon the depression of the clutch pedal that cam lever 87 will rock arm 88, thus causing gear shifting lever 65 to assume the position shown in Fig. 7, thus holding clutches 63 and 64 out of engagement with each other and disconnecting clutch drum 62 from main shaft 7 on which it is free to rotate. The purpose of this will be further described.

Figure 1:
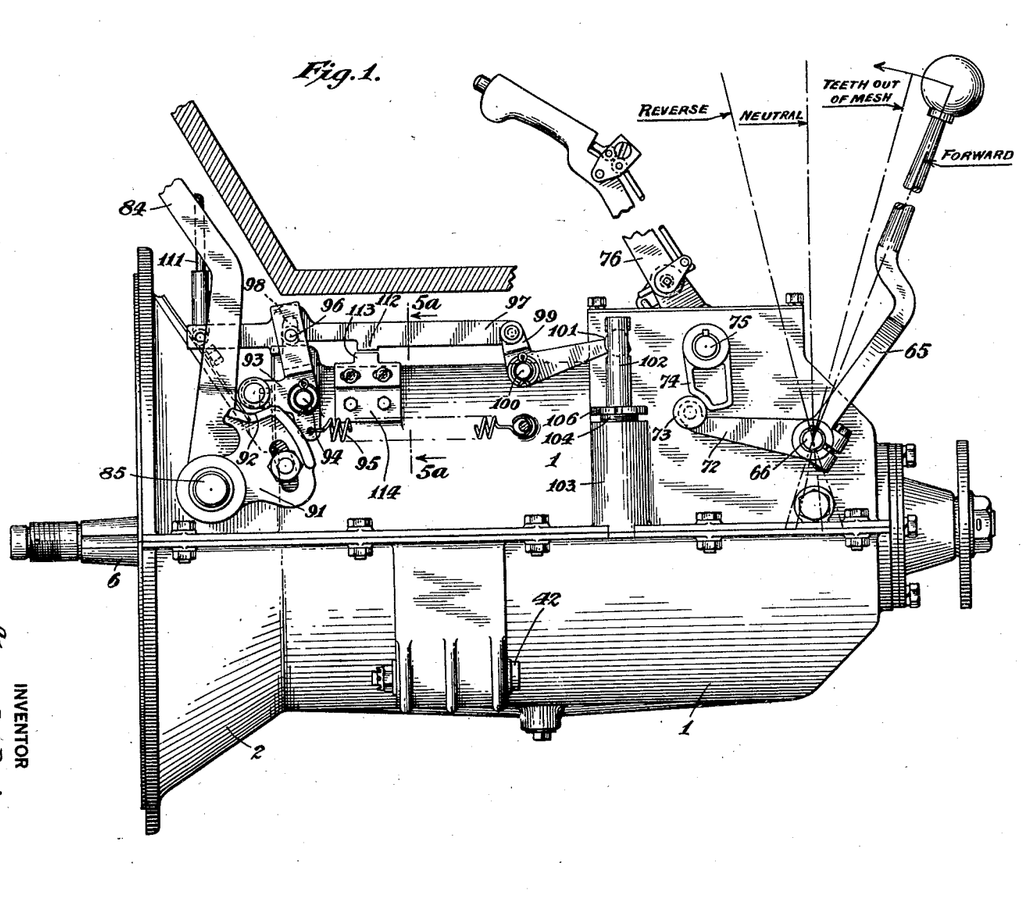
Fig. 1 is a side elevation of my improved power transmission applicable to an automobile and shows a portion of the floor board of the car in section; the clutch pedal lever broken away and parts actuated thereby, the emergency brake lever and hand lever for placing the gear in forward, neutral or reverse. The parts as shown in this figure are in a position corresponding to that of forward high speed driving.
Figure 6:
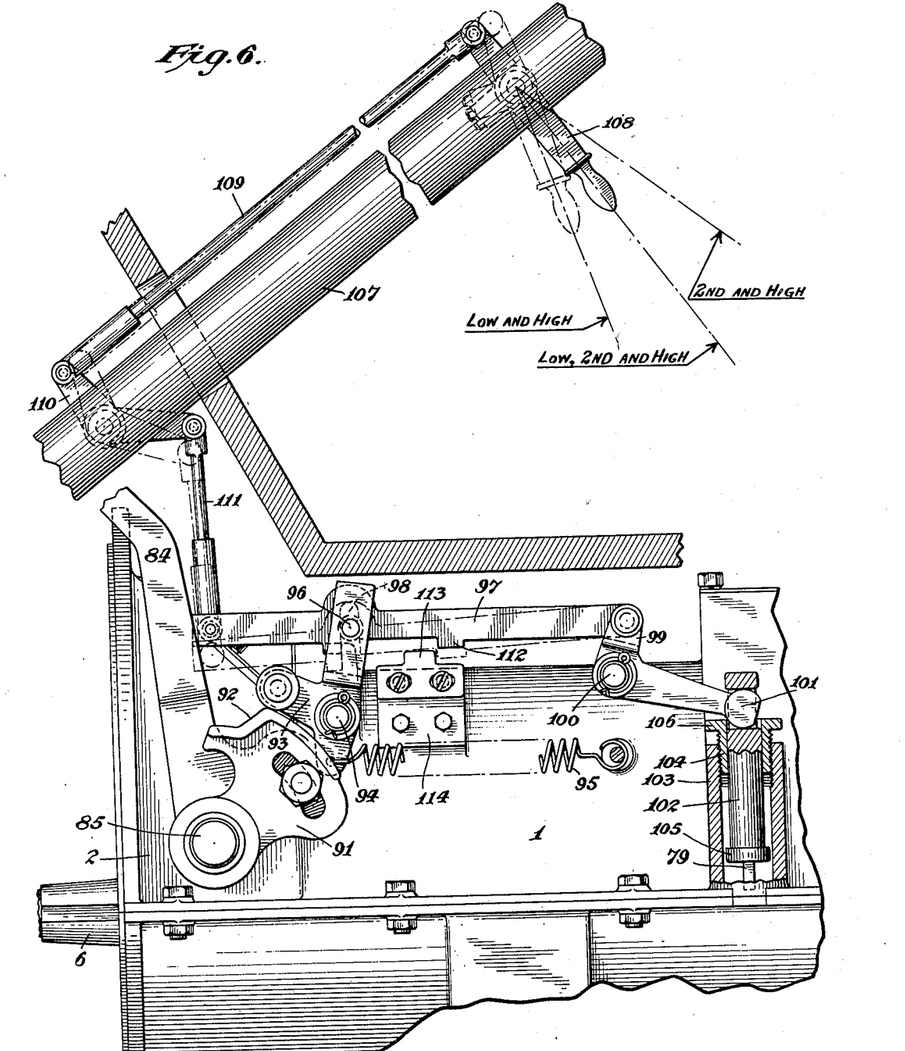
Fig. 6 is a side elevation showing the mechanism attached to the steering column of the car and connections actuated thereby, manually controlled by the setting of which either low or intermediate gear is eliminated at the will of the driver or by which the gear is locked permanently in low and high gear with intermediate eliminated for difficult road conditions.

Referring to Fig. 1, keyed to shaft 85 is adjusting lever 91 to which with toothed contact disc clamped clutch pedal lever 84 for the purpose of adjusting the same with reference to the foot board of the car. Lever 91 is constructed with a cam face 92 in operative relation with roller lever 93 adapted to rock upon stud 94 located in casing 1. Lever 93 has a spring 95 for holding the roller against cam face 92 and at its other end is formed into a fork passing through which is the pin 96. Still referring to Figs. 1 and 2, 97 is a bar or rod provided with slot 98 in which pin 96 can slide. Bar 97 has a pin connection with forked lever 99 rotatable about stud 100 mounted in casing 1 and having a headed end 101 intended to actuate plug 102 which in turn is adapted to slide vertically in lug 103 of the casing as is best shown in Fig. 6. In this figure plug 102 is seen to be arranged to depress lever 79 for the purposes which have been described. In this figure also is shown screw stop plug 104 adjustable with reference to the casing and intended to limit the upward movement of plug 102 by contact with its head 105 when said plug is in its uppermost position. It is clear that the contact of head 105 with plug 104 will limit the upward movement of plug 102 thus preventing the coil mechanism to which lever 79 is fixed from placing an excessive stress upon the second speed coil brake 41. By the adjustment of plug 104 which is formed with a slotted head shown in Fig. 1 at 106, second speed coil can be permitted to engage the drum of rotor 34 with whatever degree of softness or intensity desired thus gradually checking rotor 34 and causing the change of gear from low to second to be gradual thus eliminating the danger of shock to the mechanism or to the car regardless of the performance of the driver in engaging the foot clutch.

In the operation of motor cars at the present time it is customary in a three-speed car to utilize intermediate speed and high speed always under ordinary level conditions, starting on second gear, and to use low gear for emergency purposes or when starting the car upgrade. In heavy going in mud or snow it is also frequently desirable to travel long distances only in low gear and for the purpose of achieving these results the mechanism shown in Fig. 6 is provided which will now be described. In this figure broken off is shown steering column 107. Rotatably mounted below the steering wheel and in convenient position for the driver is hand lever 108 frictionally attached to rock upon a stud fixed to the steering column. Through rod 109, bell crank lever 110 and rod 111 which has a pin connection to bar 97, hand lever 108 serves to lift or depress bar 97. As shown in full lines in this drawing, lever 108 is set to permit the mechanism to progress from low to second and to high in the usual fashion of this transmission. This follows from the fact that every time the clutch pedal is depressed, bar 97 will be moved by cam face 92, thus depressing plug 102 and lever 79 to permit the car to start in low gear.

When lever 108 is lifted to the position indicated as "second and high" in Fig. 6, bar 97 will also be lifted to the upper position shown in dotted lines in Fig. 6 and in this position pin 96 will freely pass beneath the wall of the slot 98 and bar 97 will not be moved by the depression of the foot clutch and low gear will be eliminated until hand lever 108 is restored to its middle position in Fig. 6.

Bar 97 is also provided with a downward extending lug 112 which when said bar is depressed to its lowermost position by placing hand lever 108 in its bottom position, will engage stop lug 113. Lug 113 is an adjustable plate fastened to bracket 114 in turn attached to casing 1 as seen in Fig. 5ᵃ.

When it is desirable to drive the car indefinitely in low gear, the operator throws out his clutch thus moving lug 112 past lug 113 and while in this position he depresses hand lever 108 thereby causing lug 112 to engage lug 113 when the foot is removed from the clutch pedal. By this means plug 102 holds lever 79 in its downward position until the hand lever 108 is again moved.

It will be further noted in Fig. 1 that the roller of lever 93 normally does not come in contact with cam face 92 when in its zero position shown in this figure which enables any adjustment of the plug 104 to be made without interference.

Referring to Fig. 7 it will be noted that clutches 63 and 64 can be disengaged by moving gear shifting lever 65 a short distance in the direction of the engine, and therefore that this condition exists when the gear shifting lever is in the reverse or neutral position, and that disengagement also takes place when brake lever 76 is moved as well as when the foot clutch pedal is depressed. It has already been stated that these clutches must be separated in low gear for the reason that rotor 34 under these conditions is revolving anti-clockwise and under the influence of centrifugal force fly balls 53 and 54 cause the coil clutch to engage clutch drum 62. If the clutch were not disengaged in low, rotor 34 would have to rotate anti-clockwise while shaft 7 to which it would be attached would revolve clockwise, which would be impossible.

A very desirable feature follows from the construction shown in Fig. 7. When the gear 24 is in mesh with the gears 22, the clutches 64 and 63 engaged, and the brake or clutch 60 tight on the drum 62, the car travels in high gear. The centrifugal clutch 60 is capable of carrying the full torque of the engine at a comparatively slow speed of the car, but when the car travels slower than a predetermined speed the clutch automatically opens and rotor 34 comes to rest and the car drives in the intermediate speed. It is often desirable to change, however, from high to intermediate speed when the car is travelling so rapidly that the centrifugal clutch does not open, but by means of the gear shifting lever 65 clutches 63 and 64 can be opened at any rate of speed. When this is done rotor 34 stops and the gear assumes its intermediate relation. When driving in a second a return to high gear follows from returning lever 65 to its initial forward position as shown in Fig. 1.

When descending hills and the engine is needed as a brake on intermediate gear, the emergency brake is pulled up. This at first operates to open clutches 63 and 64 and in its continued movement tightens the emergency brake band which checks rotor 34 against clockwise movement and holds the gear in second speed. While a return of lever 65 is herein described as being manually performed, a spring may be utilized for its return if desirable. It is further to be noted that when in intermediate, the release of the throttle causes rotor 34 to instantly rotate clockwise to engage the clutch drum through the medium of the fly balls and their actuating coil, and to synchronize clutches 63 and 64 so that their engagement is without noise or jar.

For convenience, the operation of the transmission and its shift may be summarized as follows:

For high gear, the coil clutches or brakes 41 and 46 are out of operation, while the centrifugal coil clutch 60 holds tight on the drum 62, which is made fast to the driven shaft 7 by the clutches 64, 63. The gear 24 is in mesh with the gears 22, as shown in Fig. 3. Under this condition, the rotor 34 is held fast to the shaft 7, and the transmission gearing 9, 20, 23, 22, and 24 is locked into a virtually fixed connection between the shafts 6 and 7, which therefore turn as one. In other words, these shafts and the whole transmission all revolve together.

For second speed, the coil 41 is tight on the drum 39, so as to hold the rotor 34 stationary, while the coil 46 is out of action, and the gearhead 17 revolves clockwise. The gear 24 is enmeshed with the gear 22, as shown in Fig. 3, and the clutch 60 is out of action.

For low gear, the coil 46 holds the gearhead 17 arrested, while the clutch 41 is held out of action by the engagement of the plunger 102 with the arm 79 (Fig. 4), and the rotor 34 revolves counterclockwise. The gear 24 meshes with the gears 22; but the clutches 64, 63 are disengaged. Owing to this latter fact, the holding of the drums 62 by the centrifugal coil clutch 60—the rate of revolution of the rotor 34 in low gear being usually sufficient to tighten the coil 60 on said drum—is of no consequence.

For operation in reverse, the gearhead 17 is securely locked against its tendency to turn counterclockwise by engagement of the dog 80 with the gearhead teeth 81, and the coil 41 is out of action. The gear 24 is out of mesh with the gears 22, but engaged with the clutch teeth 26 of the rotor 34 so as to lock said rotor 34 to the driven shaft 7. The clutches 64, 63 being disengaged, any tightening of the coil 60 on the drum 62 can be of no consequence,—even if it could occur.

For neutral, the gear 24 is out of mesh with the gears 22 and also out of engagement with the clutch 26 on the rotor 34. The clutches 64, 63 are likewise out of engagement. Driving through the transmission under this condition is, of course, impossible.

I will now first describe the gear ratio changes for ordinary three speed operation of the transmission, in a manner resembling that of the gear shown in my above mentioned application Serial No. 725,402. For such operation, the selector handle 108 is set in the full line intermediate position marked "Low, 2nd and high" in Fig. 6 so that the pin 96 on the lever 93 operated by the clutch pedal cam 91 is always engaged with the connecting rod 97 which controls the plunger 102.

Before starting, the gear 24 is in neutral position, as above described.

On starting the engine, its clutch is thrown out by depressing the pedal lever 84 as far as possible, in the usual manner. The depression of the pedal lever 84 operates the gear shifting lever 65 to throw the gear 24 out of mesh with the gears 22 and to disengage the clutches 64, 63, and also actuates the rocker 93 through the cam 91 to depress the plunger 102 so as to hold the arm 79 of the coil controlling pulley 4ª depressed (as shown in Fig. 4) and prevent the coil 41 from being snubbed on the rotor drum 39 by counterclockwise rotation of the rotor 34. With the engine running, the driver allows the pedal lever 84 to rise till the gear 24 (owing to the action of the spring on the lever 65) meshes with the gears 22,—but not far enough to engage the clutches 64, 63, or to allow the plunger 102 to rise. The sun gear 9 acts to turn the rotor 34 counterclockwise, through reaction of the gears 22 against the gear 24, and also tends to turn the gearhead 17 counterclockwise in like manner; so that the coil 46 is snubbed on the gearhead 17 to hold the latter arrested.

To start the car, the driver opens his throttle and gradually lets in the engine clutch by further partially releasing the pedal lever 84. The clutches 64, 63 remain disengaged, the plunger 102 remains depressed, the coil 46 remains snubbed on the gearhead 17, and the car drives in low gear.

To change to second speed, the driver throttles down his engine until "it runs slower than the car," which thereupon acts clockwise through the parts 7, 24, 22 and 21 (reacting against the sun gear 9) to reverse the rotor 34 and turn it clockwise, as well as the gearhead 17,—thereby unsnubbing the coil 46 from the gearhead. As soon as the throttle is reopened and the engine thereby caused "to run faster than the car," the gearhead 17 is speeded up clockwise by reaction of the gears 22 against the gear 24, and the rotor 34 is reversed so as to turn counterclockwise again. The clutch pedal 84 having meantime been entirely released (allowing the clutches 64, 63 to engage) and the plunger 102 having risen, the counterclockwise tendency of the drum 39 results in snubbing the coil 41 on it so as to hold it arrested. Accordingly, the car now drives in second speed.

To change from second speed to high, the driver agains throttles down his engine, causing the rotor 34 to be reversed and turned clockwise by reaction of the gears 21 against the sun gear 9, and the coil 41 to be unsnubbed from the drum 39. The coil 46 remains released from the gearhead 17, which continues to turn clockwise. Accordingly, the rotor 34 gathers speed which may be sufficient to operate the centrifugal coil 60, thereby snubbing the latter on the drum 61,—which is held fast to the shaft 7 by the engagement of the clutches 64, 63. If the speed imparted to the rotor 34 by the gearhead 17 in this manner is insufficient to operate the centrifugal clutch 60, said gearhead and rotor will nevertheless be speeded up together to a sufficient degree as soon as the throttle is reopened. Accordingly, the car now drives in high.

Return from high to second speed results automatically from slowing down of the car till the centrifugal clutch 60 opens, allowing the rotor 34 to come to rest and be snubbed by the coil 41. Even with the car running so fast as to make the centrifugal clutch 60 hold, return to second speed can be obtained at will by disengaging the clutches 64, 63 by means of the lever 65. And on a hill the engine can be thrown into second speed to act as a brake by a simple tightening movement of the emergency brake lever 76, which will actuate the gear shift lever 65 through the cam 74 to disengage the clutches 64, 63.

I will now describe the use of the selective provisions for varying and controlling the changes of gear ratio.

By setting the selector handle 108 in its lowermost position (marked "Low and high" in Fig. 6) after the engine clutch has been thrown out by depression of the pedal lever 84, the connecting rod 97 will be lowered from the position shown in Fig. 6 until its lug 112 engages behind the lug 113. This will have the effect of locking the plunger 102 down (regardless of subsequent movement of the pedal lever 84) until the selector is differently set, so that the coil clutch 41 will be held out of action. Hence the car can only drive in low gear or in high, and the transmission will change directly from one to the other and back again when the throttle is manipulated, etc., to vary the gear ratio.

On the other hand, if the selector handle 108 is set in its uppermost position (marked "2nd and high" in Fig. 6), then the connecting rod 97 will be definitely held above the pin 96, so that the plunger 102 cannot be depressed by the clutch pedal lever 84 until the selector is differently set again. Accordingly, the car can only drive in second speed or in high, because it is impossible for the rotor 34 to turn counter-clockwise without being snubbed and held arrested by the coil 41. Hence the transmission will change back and forth between second speed and high when the throttle is manipulated, etc., without ever going into low at all.

Many different embodiments of my invention will suggest themselves to those skilled in the art to which this mechanism belongs without departing from its spirit and scope. Therefore I do not desire to be limited to any of the details set forth herein.

Having now described my invention, what I claim as new and desire to secure by Letters Patent is:

1. In a transmission of the character described, the combination with driving and driven shafts of variable change speed gearing for interconnecting them, with means responsive to a reversal of driving relations between the said shafts for controlling and varying its transmission ratio, and selective means for controlling and varying the operation of said ratio-controlling means and thereby varying the order and number of transmission ratios in the operation of the transmission.

2. In a self-propelled vehicle transmission, the combination with an engine clutch and pedal mechanism for operating it, and driving and driven shafts, of variable change speed gearing for interconnecting said shafts, with means for controlling and varying its transmission ratio operable by said clutch pedal mechanism and by reversals of driving relations between said shafts, and selective means for controlling and varying the operation of said ratio-controlling means by said clutch pedal mechanism and thereby varying the speed changes in the operation of the transmission.

3. In a self-propelled vehicle transmission, the combination with an engine clutch and pedal mechanism for operating it, and driving and driven shafts, of variable change speed gearing for interconnecting said shafts, with means actuated by said clutch pedal mechanism and by reversal of driving relations in said gearing for controlling and varying the transmission ratio, and selective means for controlling and varying the operation of said ratio-controlling means and thereby varying the order and number of transmission ratios in the operation of the transmission.

4. In a transmission of the character described, the combination with driving and driven shafts of variable change speed gearing for interconnecting them, including rotatable means for controlling and varying the transmission ratio, brake means responsive to reversal of driving relations in said gearing for controlling said rotatable means and thereby changing the transmission ratio, and selective means for controlling the action of said brake means and thereby varying the sequence of transmission ratios.

5. In a self-propelled vehicle transmission, the combination with an engine clutch and pedal mechanism for operating it, and driving and driven shafts, of variable change speed gearing for interconnecting said shafts including rotatable parts for controlling and varying the transmission ratio, means for controlling the rotation of said parts operable by said clutch pedal mechanism, and selective means for controlling and varying the operation of said rotation-controlling means by said clutch pedal mechanism and thereby selecting the speed ratio under which the vehicle starts on release of the clutch pedal mechanism and the subsequent sequence of speed ratios in the operation of the vehicle.

6. In a self-propelled vehicle, the combination with a steering column, an engine clutch and pedal mechanism for operating it, and driving and driven shafts, of three-speed gearing for interconnecting said shafts with means responsive to reversals in driving relations between the shafts for controlling and varying the transmission ratio operable by said clutch pedal mechanism, and selective means on said steering column for controlling and varying the operation of said first-named means by said clutch pedal mechanism and thereby determining whether, on release of said clutch mechanism, the vehicle starts in first speed and thereafter progresses to second speed and then to high, or starts in second speed at once, or starts in first speed and skips second speed in progressing to high.

7. In an automobile power transmission, a driving shaft, a driven shaft, a gear carrying member rotatable about said driven shaft, a coil brake surrounding said gear carrying member, controlling mechanism for said coil brake, an engine clutch pedal, and selective means effective in one position upon depression of the clutch pedal for operating said brake controlling mechanism to hold said coil brake out of engagement with said gear carrying member and to permit engagement of said brake with the gear carrying member upon release of the clutch pedal, said selective means being operative in a second position to hold the brake in a released position upon release of the clutch pedal and being held in a third position to effect no control of the brake.

8. In an automobile power transmission, a driving shaft, a driven shaft, a rotatable gear carrying member mounted on said driven shaft, a brake for engaging said gear carrying member, mechanism for controlling said brake, a plunger for governing said brake controlling mechanism, a stop for limiting the movement of said plunger, a clutch pedal, and selective means for controlling the operation of said plunger by the clutch pedal.

9. In a transmission of the character described, the combination with driving and driven shafts of variable change speed gearing for interconnecting them including a rotatable part for controlling and varying the transmission ratio, another rotatable part and speed controlled clutch means for connecting it to that first mentioned, and clutch means for connecting the latter rotatable part to the driven shaft and disconnecting it therefrom.

10. In a transmission of the character described, the combination with driving and driven shafts of variable change speed gearing for interconnecting them including a rotatable part for controlling and varying the transmission ratio, another rotatable part, a centrifugal coil clutch carried by the first-mentioned rotatable part for connecting said rotatable parts together, and clutch means for connecting the latter rotatable part to the driven shaft and disconnecting it therefrom.

11. In a transmission of the character described, the combination with driving and driven shafts of variable change speed gearing for interconnecting them including a rotatable part for controlling and varying the transmission ratio, another rotatable part, clutch means controlled by the speed of the first-mentioned rotatable part for connecting said rotatable parts together, and clutch means for connecting the latter rotatable part to the driven shaft and disconnecting it therefrom.

12. In an automobile transmission, the combination with driving and driven shafts, engine clutch, and pedal mechanism for operating the clutch, of variable change speed gearing for interconnecting said shafts including a rotatable part for controlling and varying the transmission ratio, another rotatable part and speed-controlled clutch means for connecting it to that first mentioned, and clutch means for connecting the latter rotatable part to the driven shaft controlled by said pedal mechanism.

13. In a transmission of the character described, the combination with driving and driven shafts of variable change speed gearing for interconnecting them including a rotatable part for controlling and varying the transmission ratio and a gear shiftable to alter the effective connection through said gearing, another rotatable part and clutch means controlled by the speed of the first-mentioned rotatable part for connecting said rotatable parts together, a lever for shifting said shiftable gear, and clutch means for connecting the second rotatable part to the driven shaft operable by said gear-shifting lever.

14. In a self propelled vehicle having an emergency brake, the combination with driving and driven shafts of variable change speed gearing for interconnecting them including a rotatable part for controlling and varying the transmission ratio, and a gear shiftable to break or alter the effective connection through said gearing, another rotatable part and speed controlled clutch means for connecting it to that first-mentioned, an emergency brake lever and a gear-shifting lever, and clutch means for connecting the second rotatable part to the driven shaft controlled by said levers.

In witness whereof I have hereunto set my hand.

ALEXANDER DOW.